US010444719B2

(12) United States Patent
Murakami et al.

(10) Patent No.: US 10,444,719 B2
(45) Date of Patent: Oct. 15, 2019

(54) ENERGY MANAGEMENT DEVICE AND ENERGY MANAGEMENT METHOD

(71) Applicant: Panasonic Intellectual Property Management Co., Ltd., Osaka (JP)

(72) Inventors: Shuji Murakami, Osaka (JP); Akira Hashiguchi, Tokyo (JP); Yoshiyasu Takeuchi, Osaka (JP); Osamu Sekine, Osaka (JP); Yukiko Nagoshi, Osaka (JP); Takashi Kakiuchi, Osaka (JP); Toshiki Yagi, Kanagawa (JP); Masahiko Tamura, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 140 days.

(21) Appl. No.: 15/673,770

(22) Filed: Aug. 10, 2017

(65) Prior Publication Data

US 2018/0032045 A1 Feb. 1, 2018

Related U.S. Application Data

(63) Continuation of application No. PCT/JP2017/003774, filed on Feb. 2, 2017.

(30) Foreign Application Priority Data

Jul. 29, 2016 (JP) .................................. 2016-150526

(51) Int. Cl.
*G05B 19/042* (2006.01)
*H02J 13/00* (2006.01)
(Continued)

(52) U.S. Cl.
CPC ........... *G05B 19/042* (2013.01); *G05B 15/02* (2013.01); *H02J 13/0006* (2013.01);
(Continued)

(58) Field of Classification Search
CPC ......... G05B 19/042; G05B 2219/25419; H02J 13/0006; H02J 2003/143; Y02B 70/3216;
(Continued)

(56) References Cited

U.S. PATENT DOCUMENTS

| 2009/0217684 A1* | 9/2009 | Ouchi | ................... F25D 21/002 62/155 |
| 2009/0240381 A1* | 9/2009 | Lane | ......................... H02J 3/14 700/296 |

(Continued)

FOREIGN PATENT DOCUMENTS

JP 2013-106380 5/2013

OTHER PUBLICATIONS

International Search Report of PCT application No. PCT/JP2017/003774 dated Apr. 18, 2017.

*Primary Examiner* — Thomas C Lee
*Assistant Examiner* — Michael Tang
(74) *Attorney, Agent, or Firm* — Greenblum & Bernstein, P.L.C.

(57) ABSTRACT

An energy management device includes: an acquirer that acquires a reduction target period, a reduction target amount, an equipment type, a presence of a special operation schedule, a scheduled time of a special operation, and a status; a generator that generates multiple control patterns on the basis of the information acquired by the acquirer; a selector that selects a control pattern to execute from among the multiple control patterns; and a controller that transmits control information to the equipment to be controlled on the basis of the control pattern to execute. At least one of the multiple control patterns is a control pattern for shifting the scheduled time of a special operation to outside the reduc- (Continued)

tion target period, and reducing the power consumption amount by the reduction target amount or more during the reduction target period.

8 Claims, 11 Drawing Sheets

(51) Int. Cl.
*G05B 15/02* (2006.01)
*H02J 3/14* (2006.01)
(52) U.S. Cl.
CPC .............. *G05B 2219/25419* (2013.01); *G05B 2219/2639* (2013.01); *H02J 2003/143* (2013.01); *Y02B 70/3216* (2013.01); *Y02B 70/3266* (2013.01); *Y04S 20/221* (2013.01); *Y04S 20/242* (2013.01)
(58) Field of Classification Search
CPC .. Y02B 70/3266; Y04S 20/221; Y04S 20/242
See application file for complete search history.

(56) References Cited

U.S. PATENT DOCUMENTS

| | | | |
|---|---|---|---|
| 2013/0173440 A1* | 7/2013 | Kouda | G06Q 30/0283 705/34 |
| 2016/0041574 A1* | 2/2016 | Maitani | G06Q 50/16 700/291 |
| 2017/0104330 A1* | 4/2017 | Nakaishi | H02J 3/14 |
| 2018/0262003 A1* | 9/2018 | Yabe | H02S 50/10 |

* cited by examiner

| ID | EQUIPMENT TYPE | INSTALLATION LOCATION |
|---|---|---|
| 1 | AIR CONDITIONER (INDOOR UNIT) | INSIDE SHOP, EAST SIDE |
| 2 | AIR CONDITIONER (INDOOR UNIT) | INSIDE SHOP, WEST SIDE |
| 3 | AIR CONDITIONER (OUTDOOR UNIT) | OUTSIDE SHOP, WEST WALL |
| 4 | SHOWCASE | INSIDE SHOP, SOUTHEAST SIDE |
| 5 | SHOWCASE | INSIDE SHOP, SOUTHWEST SIDE |
| 6 | LIGHTING DEVICE | INSIDE SHOP, SOUTH SIDE |
| 7 | LIGHTING DEVICE | INSIDE SHOP, NORTH SIDE |

FIG. 5

| ID | UPDATE TIME | OPERATING STATUS | RUNNING MODE | SET TEMPERATURE | INDOOR TEMPERATURE | OUTDOOR TEMPERATURE | INDOOR HUMIDITY | OUTDOOR HUMIDITY |
|---|---|---|---|---|---|---|---|---|
| 1 | 2016/08/10 12:00 | ON | COOLING | 26.0 | 25.5 | 31.0 | 60 | 80 |
| 2 | 2016/08/10 12:00 | ON | AUTOMATIC | 25.5 | 25.0 | 30.0 | 60 | 80 |

| ID | PRESENCE OF SPECIAL OPERATION SCHEDULE | SCHEDULED TIME OF SPECIAL OPERATION |
|---|---|---|
| 1 | NO | - |
| 2 | NO | - |
| 3 | NO | - |
| 4 | YES | 2016/08/10 14:00-14:30 |
| 5 | YES | 2016/08/10 15:00-15:30 |
| 6 | NO | - |
| 7 | NO | - |

FIG. 10

CONTROL PATTERN #1

CONTROL INFORMATION #1-1

| ID | EQUIPMENT TYPE | CONTROLLED PROPERTY 1 | SET VALUE 1 | CONTROLLED PROPERTY 2 | SET VALUE 2 | CONTROLLED PROPERTY 3 | SET VALUE 3 |
|---|---|---|---|---|---|---|---|
| 1 | AIR CONDITIONER (INDOOR UNIT) | SET TEMPERATURE | 28.0 | - | - | - | - |

CONTROL INFORMATION #1-2

| ID | EQUIPMENT TYPE | CONTROLLED PROPERTY 1 | SET VALUE 1 | CONTROLLED PROPERTY 2 | SET VALUE 2 | CONTROLLED PROPERTY 3 | SET VALUE 3 |
|---|---|---|---|---|---|---|---|
| 2 | AIR CONDITIONER (INDOOR UNIT) | SET TEMPERATURE | 28.0 | - | - | - | - |

CONTROL INFORMATION #1-3

| ID | EQUIPMENT TYPE | CONTROLLED PROPERTY 1 | SET VALUE 1 | CONTROLLED PROPERTY 2 | SET VALUE 2 | CONTROLLED PROPERTY 3 | SET VALUE 3 |
|---|---|---|---|---|---|---|---|
| 6 | LIGHTING DEVICE | OPERATING STATUS | OFF | - | - | - | - |

FIG. 11

CONTROL PATTERN #2

CONTROL INFORMATION #2-1

| ID | EQUIPMENT TYPE | CONTROLLED PROPERTY 1 | SET VALUE 1 | CONTROLLED PROPERTY 2 | SET VALUE 2 | CONTROLLED PROPERTY 3 | SET VALUE 3 |
|---|---|---|---|---|---|---|---|
| 1 | AIR CONDITIONER (INDOOR UNIT) | OPERATING STATUS | OFF | - | - | - | - |

CONTROL INFORMATION #2-2

| ID | EQUIPMENT TYPE | CONTROLLED PROPERTY 1 | SET VALUE 1 | CONTROLLED PROPERTY 2 | SET VALUE 2 | CONTROLLED PROPERTY 3 | SET VALUE 3 |
|---|---|---|---|---|---|---|---|
| 2 | AIR CONDITIONER (INDOOR UNIT) | OPERATING STATUS | OFF | - | - | - | - |

CONTROL INFORMATION #2-3

| ID | EQUIPMENT TYPE | CONTROLLED PROPERTY 1 | SET VALUE 1 | CONTROLLED PROPERTY 2 | SET VALUE 2 | CONTROLLED PROPERTY 3 | SET VALUE 3 |
|---|---|---|---|---|---|---|---|
| 6 | LIGHTING DEVICE | OPERATING STATUS | OFF | - | - | - | - |

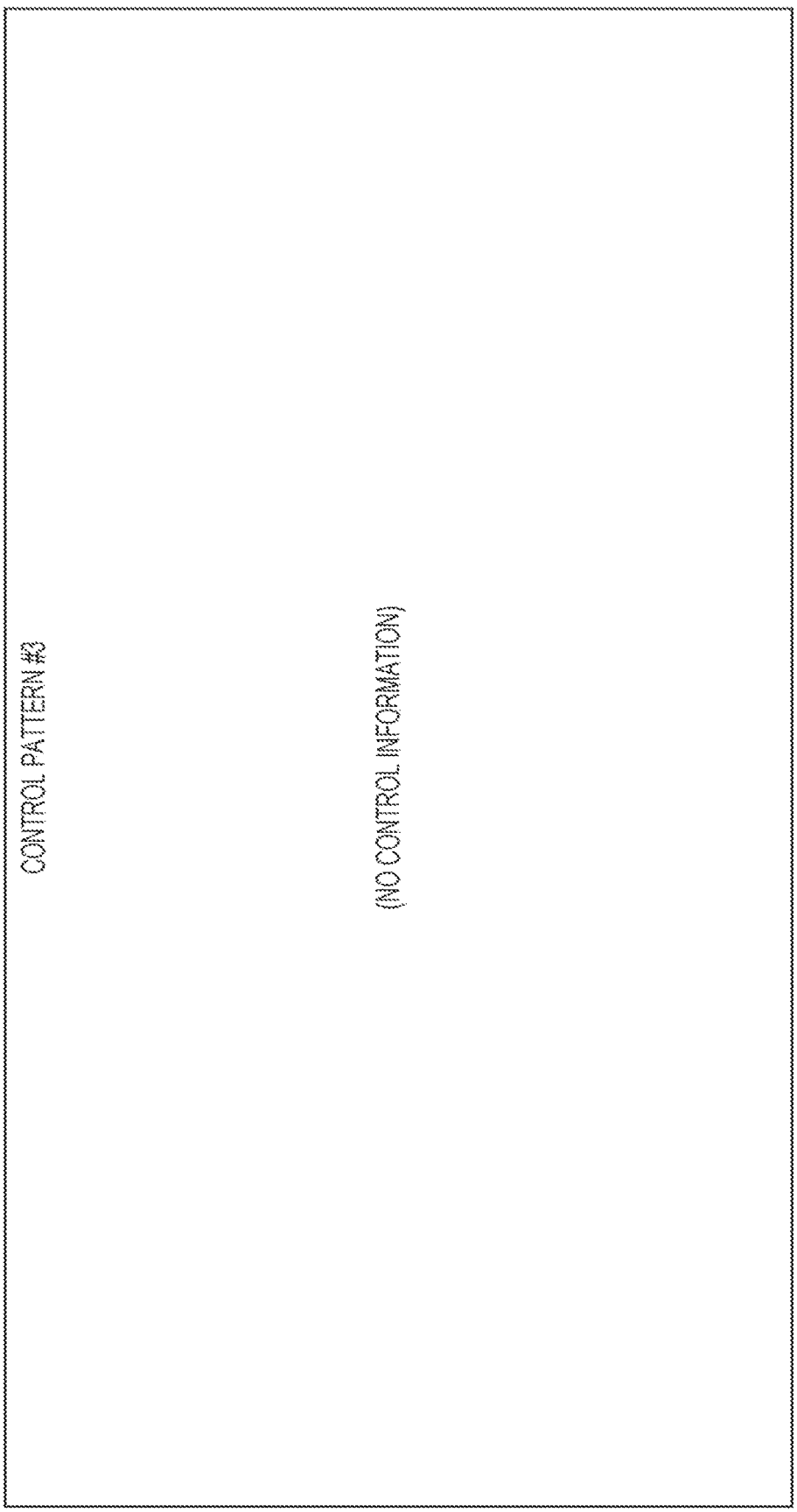

ENERGY MANAGEMENT DEVICE AND ENERGY MANAGEMENT METHOD

BACKGROUND

1. Technical Field

The present disclosure relates to an energy management device and the like that support energy conservation.

2. Description of the Related Art

Recently, to raise corporate image or improve profits, reducing energy consumption in shops, or in other words energy conservation, is being taken seriously. In particular, for corporations that open multiple shops, such as multiple convenience stores or multiple supermarkets, energy conservation at each shop is recommended, because the combined minor energy savings from each shop may result in a large effect.

One technology that realizes energy conservation is the technology described in Japanese Unexamined Patent Application Publication No. 2013-106380, for example. With the technology described in Japanese Unexamined Patent Application Publication No. 2013-106380, a resident sets a consumption target power arbitrarily, up to a contracted amount of power. Additionally, a monitoring control board computes the total power consumption from the power consumption of respective electric equipment. Additionally, if the total power consumption exceeds the consumption target power, the monitoring control board selects electric equipment to shut down from among the electric equipment currently operating, on the basis of a preset priority ranking, announces the selected electric equipment together with the excess power consumption, and shuts down the selected electric equipment at a certain timing. With this arrangement, the consumption of energy is potentially reduced.

SUMMARY

However, with the above technology of the related art, when the total power consumption exceeds the consumption target power, the electric equipment to shut down and the power consumption excess are announced. Such technology is not necessarily suited to energy conservation based on a reduction target period and a reduction target amount for the power consumption amount of multiple pieces of equipment.

One non-limiting and exemplary embodiment provides an energy management device and the like enabling the appropriate support of energy conservation based on a reduction target period and a reduction target amount for the power consumption amount of multiple pieces of equipment.

In one general aspect, the techniques disclosed here feature an energy management device including: an acquirer that acquires: a reduction target period, in which power consumption of a plurality of equipment is reduced, a reduction target amount of the power consumption during the reduction target period, an equipment type of each of the plurality of equipment, a presence of a special operation schedule for each of the plurality of equipment, a scheduled time of a special operation for each of at least one equipment having the special operation schedule, and a status of each of the plurality of equipment; a generator that generates a plurality of control patterns with respect to the plurality of equipment, on the basis of the reduction target period, the reduction target amount, the equipment type, the presence of a special operation schedule, the scheduled time of a special operation, and the status; the plurality of control patterns having control content different from each other; a selector that selects a control pattern to execute from the plurality of control patterns; and a controller that transmits control information to one of the plurality of equipment, on the basis of the selected control pattern, the control information controlling the one of the plurality of equipment, wherein at least one of the plurality of control patterns shifts the scheduled time of a special operation to outside the reduction target period, and reduces the power consumption by the reduction target amount or more during the reduction target period.

It should be noted that that these general or specific aspects may also be implemented as a system, a method, an integrated circuit, a computer program, a non-transitory computer-readable recording medium such as a CD-ROM disc, or any selective combination thereof.

An energy management device and the like according to one aspect of the present disclosure are able to appropriately support energy conservation based on a reduction target period and a reduction target amount for the power consumption amount of multiple pieces of equipment.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 is a diagram illustrating an example of an equipment status database (DB) according to an embodiment;

FIG. 10 is a diagram illustrating an example of a control pattern #1 according to an embodiment;

FIG. 11 is a diagram illustrating an example of a control pattern #2 according to an embodiment;

FIG. 12 is a diagram illustrating an example of a control pattern #3 according to an embodiment.

DETAILED DESCRIPTION

Figure 1:
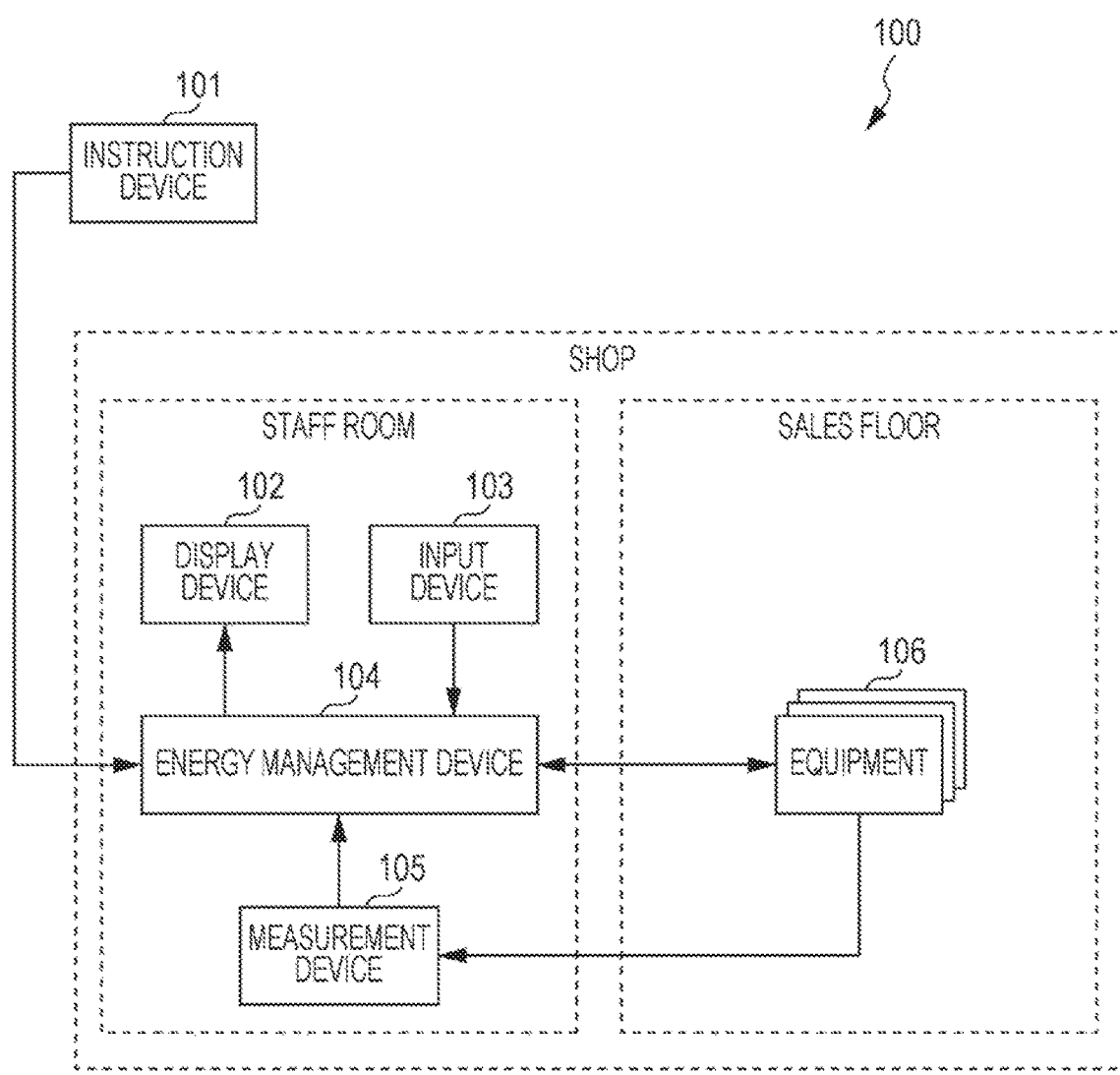
FIG. 1 is a diagram illustrating an exemplary configuration of an energy management system according to an embodiment.

Underlying Knowledge Forming Basis of the Present Disclosure

The inventors discovered issues like the following regarding an energy management device and the like that support energy conservation.

For example, in some cases, there is demand for the power consumption amount of multiple pieces of equipment to be reduced by a reduction target amount or more during a reduction target period. In such cases, it is not easy to individually modify the operation of each of the multiple pieces of equipment so that the power consumption amount of the multiple pieces of equipment is reduced by the reduction target amount or more.

Also, there is a possibility that an operation with high power consumption may be started during the reduction target period for the power consumption amount. Consequently, there is a possibility that the reduction of the power consumption amount may not be conducted appropriately.

Accordingly, an energy management device according to one aspect of the present disclosure includes: an acquirer that acquires: a reduction target period, in which power consumption of a plurality of equipment is reduced, a reduction target amount of the power consumption during the reduction target period, an equipment type of each of the plurality of equipment, a presence of a special operation schedule for each of the plurality of equipment, a scheduled time of a special operation for each of at least one equipment having the special operation schedule, and a status of each of the plurality of equipment; a generator that generates a plurality of control patterns with respect to the plurality of equipment, on the basis of the reduction target period, the reduction target amount, the equipment type, the presence of a special operation schedule, the scheduled time of a special operation, and the status, the plurality of control patterns having control content different from each other; a selector that selects a control pattern to execute from the plurality of control patterns; and a controller that transmits control information to one of the plurality of equipment, on the basis of the selected control pattern, the control information controlling the one of the plurality of equipment, wherein at least one of the plurality of control patterns shifts the scheduled time of a special operation to outside the reduction target period, and reduces the power consumption by the reduction target amount or more during the reduction target period.

With this arrangement, the equipment to be controlled is controlled appropriately in accordance with a control pattern to execute with respect to multiple equipment. Also, flexible control of multiple equipment on the basis of multiple control patterns is possible. In addition, in a case in which the scheduled time for a special operation is shifted, and a control pattern for reducing the power consumption amount of the reduction target amount or more is selected as the control pattern to execute, the reduction of the power consumption amount is conducted appropriately. Consequently, the energy management device is able to appropriately support energy conservation based on a reduction target period and a reduction target amount for the power consumption amount of multiple pieces of equipment.

Also, for example, the generator further displays the plurality of control patterns on a display.

With this arrangement, the energy management device is able to present multiple control patterns related to energy conservation to a user. Consequently, the energy management device is able to encourage the user to take action regarding energy conservation.

Also, for example, the selector further accepts a selection of the control pattern from a user via an input device.

With this arrangement, the energy management device is able to select a control pattern to execute in accordance with an operation performed by a user. Consequently, the energy management device is able to select an appropriate control pattern as the control pattern to execute.

Also, for example, the equipment type of one of the plurality of equipment is one of an air conditioner, a showcase, and a lighting device.

With this arrangement, the energy management device is able to generate a control pattern on the basis of an air conditioner, a showcase, or a lighting device.

Also, for example, the status of one of the plurality of equipment includes at least one of an operating status, a running mode, a set temperature, an indoor temperature, an outdoor temperature, an indoor humidity, and an outdoor humidity.

With this arrangement, the energy management device is able to generate a control pattern on the basis of an operating status, a running mode, a set temperature, an indoor temperature, an outdoor temperature, an indoor humidity, or an outdoor humidity.

Also, for example, the special operation for one of the at least one equipment having the special operation schedule is a defrosting operation.

With this arrangement, the energy management device is able to generate a control pattern for shifting a defrosting operation to outside a reduction target period.

Note that these general or specific aspects may also be realized by a system, a method, an integrated circuit, a computer program, a non-transitory computer-readable recording medium such as a CD-ROM disc, or any selective combination thereof.

Embodiments

Hereinafter, embodiments will be described specifically with reference to the drawings. Note that the exemplary embodiments described hereinafter all illustrate general or specific examples. Features such as numerical values, shapes, materials, structural elements, layout positions and connection states of structural elements, steps, and the ordering of steps indicated in the following exemplary embodiments are merely examples, and are not intended to limit the scope of the claims. In addition, among the structural elements in the following exemplary embodiments, structural elements that are not described in the independent claim indicating the broadest concept are described as arbitrary or optional structural elements.

Also, each diagram is a schematic diagram, and does not necessarily illustrate a strict representation. Also, in each diagram, parts of the configuration which are essentially the same are denoted with the same signs, and duplicate description of such parts may be omitted or simplified in some cases.

Also, a power amount ordinarily means the integrated value of the power over a certain time, and corresponds to electrical energy. Herein, an amount of power is called a power amount in some cases. Also, power and power amount (energy) correspond to each other. For this reason, herein, power is used in the sense of power amount (energy) in some cases, while power amount is used in the sense of the power corresponding to the power amount per unit time in some cases. Also, the power and the power amount mean their respective values in some cases.

Also, terms such as reduction target period, reduction target amount, identification number (ID), equipment type, installation location, presence of special operation schedule, scheduled time of special operation, and status related to equipment mean information respectively indicating the above in some cases.

[Configuration of Energy Management System]

FIG. 1 illustrates an exemplary configuration of an energy management system according to the present embodiment. In this exemplary configuration, the energy management system 100 is provided with an instruction device 101, a display device 102, an input device 103, an energy management device 104, a measurement device 105, and multiple pieces of equipment 106. Also, the display device 102, the input device 103, the energy management device 104, and the measurement device 105 are installed in the staff room of a shop, while the multiple pieces of equipment 106 are installed in a sales floor of the shop.

The arrangement of structural elements is not limited to the example illustrated in FIG. 1. In particular, the energy management device 104 may also be installed externally to the shop. Also, the display device 102, the input device 103, and the measurement device 105 may be installed in the sales floor. Also, the measurement device 105 may be installed in the area surrounding the shop. Also, some of the multiple pieces of equipment 106 may be installed in the staff room, or may be installed in the area surrounding the shop.

The instruction device 101 is a device that issues an instruction for reducing the power consumption amount during a reduction target period. The instruction may be compatible with what is called demand response. Also, the instruction device 101 may also be a computer equipped with components such as memory and a processor. The instruction device 101 may include a wired communication function, and may also include a wireless communication function. For example, the instruction device 101 is managed by a power supply business or the like, and transmits to the energy management device 104 an instruction signal indicating a reduction target period and a reduction target amount for the power consumption amount. Additionally, the instruction device 101 may be managed by an operating center or a management company that operates and manages multiple shops, and transmit respective instruction signals to energy management devices 104.

The display device 102 is a device that displays information. The display device 102 may be a liquid crystal display. For example, the display device 102 displays multiple control patterns generated by the energy management device 104.

The input device 103 is a device that inputs information. The input device 103 may be a keyboard, mouse, touch panel, or the like. The display device 102 and the input device 103 may also be an integrated device, such as a tablet, a smartphone, a mobile phone, or the like. The display device 102 and the input device 103 may include a wired communication function, and may also include a wireless communication function.

The energy management device 104 is a device that generates multiple control patterns, selects a control pattern to execute from among the multiple control patterns, and controls equipment 106 to be controlled in accordance with the control pattern to execute. The energy management device 104 may also be a computer equipped with components such as memory and a processor.

The energy management device 104 includes a wired or wireless communication function, and is able to communicate with all or some of the multiple pieces of equipment 106. Also, the energy management device 104 is able to communicate with the instruction device 101, the display device 102, the input device 103, and the measurement device 105.

For example, the energy management device 104 receives an instruction signal from the instruction device 101. Also, the energy management device 104 receives the power consumption amount of each piece of equipment 106 from the measurement device 105. Also, the energy management device 104 receives information about each piece of equipment 106 from each piece of equipment 106. Also, the energy management device 104 receives information input into the input device 103.

Subsequently, on the basis of the received information, the energy management device 104 generates multiple control patterns, and displays the multiple control patterns on the display device 102. Subsequently, the energy management device 104 accepts via the input device 103 the selection of a control pattern to execute, and transmits control information to equipment 106 to be controlled, on the basis of the control pattern to execute.

Note that the control pattern to execute is one control pattern among the multiple control patterns. The equipment 106 to be controlled is at least one equipment 106 included among the multiple pieces of equipment 106, and is equipment 106 to be controlled in accordance with the control pattern to execute.

The measurement device 105 is a device that measures the power consumption amount. The measurement device 105 may be a so-called smart meter. The measurement device 105 may include a wired communication function, and may also include a wireless communication function. The measurement device 105 measures the power consumption amount of all or each of the multiple pieces of equipment 106, and reports the measured power consumption amount to the energy management device 104.

Each of the multiple pieces of equipment 106 is a piece of electric equipment. The equipment 106 may be a device such as an air conditioner, a showcase used for freezing or chilling, a lighting device, an electric kettle, a freezer, or a refrigerator. The equipment 106 may also be a piece of refrigeration equipment, which collectively refers to equipment such as showcases used for freezing or chilling. The equipment 106 basically consumes power supplied to the shop, but may also generate power. For example, the multiple pieces of equipment 106 may include storage batteries or fuel cells.

Additionally, some or all of the multiple pieces of equipment 106 may include a wired communication function, and may also include a wireless communication function.

[Configuration of Energy Management Device]

Figure 2:
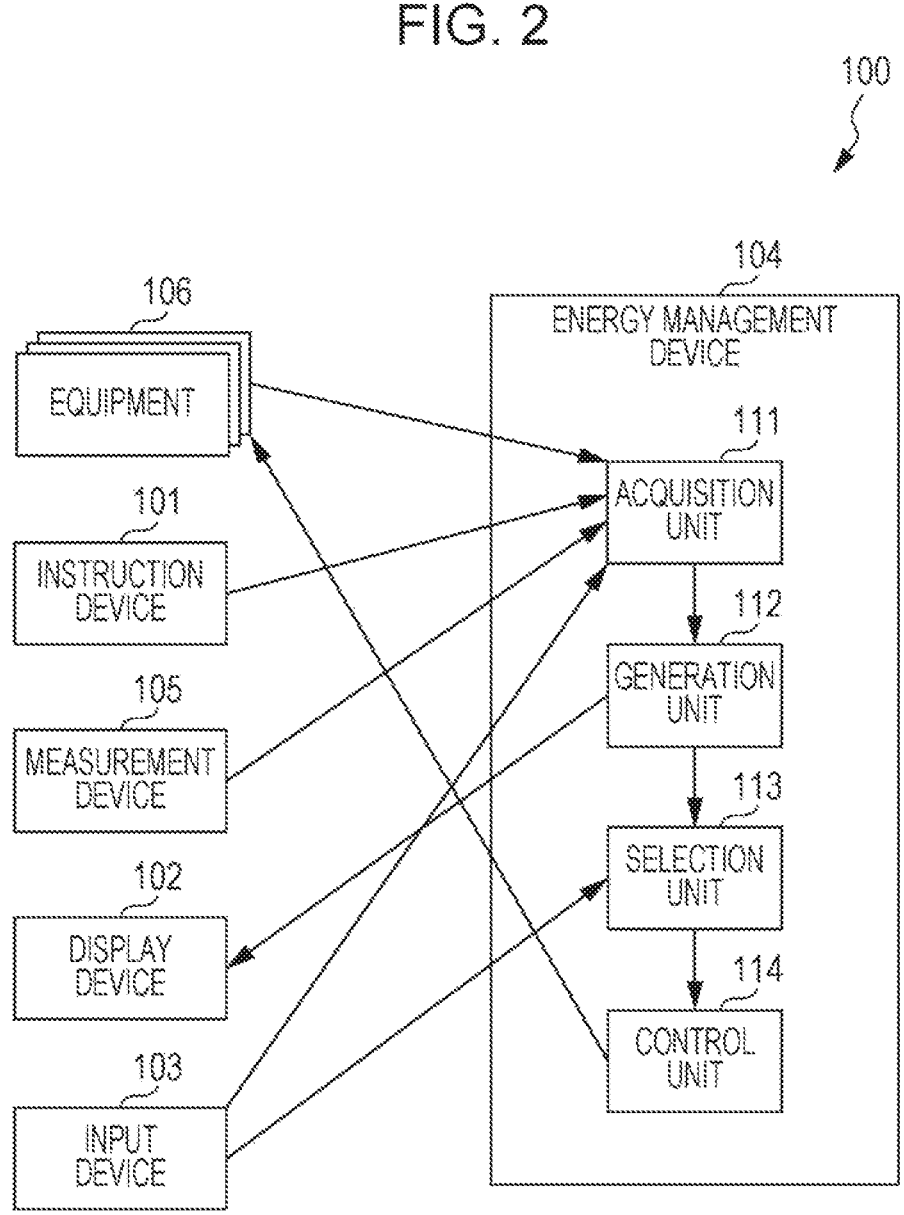
FIG. 2 is a diagram illustrating an exemplary configuration of an energy management device according to an embodiment.

FIG. 2 illustrates an exemplary configuration of the energy management device 104 illustrated in FIG. 1. In this example, the energy management device 104 is provided with an acquisition unit 111, a generation unit 112, a selection unit 113, and a control unit 114.

The acquisition unit 111 is an acquirer that acquires information. For example, the acquisition unit 111 acquires a reduction target period, a reduction target amount, an equipment type, a presence of a special operation schedule, a scheduled time of a special operation, and a status.

Herein, the reduction target period is a period during which the power consumption amount of the multiple pieces of equipment 106 is to be reduced. The reduction target amount is a target amount by which the power consumption amount is to be reduced during the reduction target period. The equipment type is the type of equipment for each of the multiple pieces of equipment 106. The presence of a special operation schedule is the presence or absence of a schedule (whether a schedule exists or not) for a special operation of each of the multiple pieces of equipment 106, The scheduled time of a special operation is a scheduled time for a special operation of each of at least one equipment 106 having a special operation schedule from among the multiple pieces of equipment 106. The status is a status related to each of the multiple pieces of equipment 106.

For example, the acquisition unit 111 acquires the reduction target period and the reduction target amount by receiving an instruction signal indicating the reduction target period and the reduction target amount from the instruction device 101. In addition, by receiving the power consumption amount from the measurement device 105, the acquisition unit 111 may also acquire a reduction target period and a reduction target amount for keeping the power consumption amount within a target power amount.

As another example, by receiving information about each piece of equipment 106 from each of the multiple pieces of equipment 106, the acquisition unit 111 acquires the equipment type, the presence of a special operation schedule, the scheduled time of a special operation, and the status. The acquisition unit 111 may also acquire the equipment type, the presence of a special operation schedule, the scheduled time of a special operation, and the status by receiving information input into the input device 103 by a user.

The generation unit 112 is a generator that generates multiple control patterns. For example, the generation unit 112 generates multiple control patterns on the basis of the reduction target period, the reduction target amount, the equipment type, the presence of a special operation schedule, the scheduled time of a special operation, and the status. Each of the multiple control patterns is a control pattern with respect to the multiple pieces of equipment 106, and the control content is different among the multiple control patterns. The generation unit 112 may also display the multiple generated control patterns on the display device 102.

The selection unit 113 is a selector that selects a control pattern to execute from among the multiple control patterns. The selection unit 113 may also accept the selection of the control pattern to execute from a user via the input device 103. Subsequently, the selection unit 113 may obey the accepted selection and select the control pattern to execute from among the multiple control patterns generated by the generation unit 112.

The control unit 114 is a controller that controls the equipment 106. For example, the control unit 114 controls equipment 106 to be controlled by transmitting control information for controlling the equipment 106 to be controlled to the equipment 106 to be controlled from among the multiple pieces of equipment 106, on the basis of the control pattern to execute selected by the selection unit 113.

Figures 3, 4:
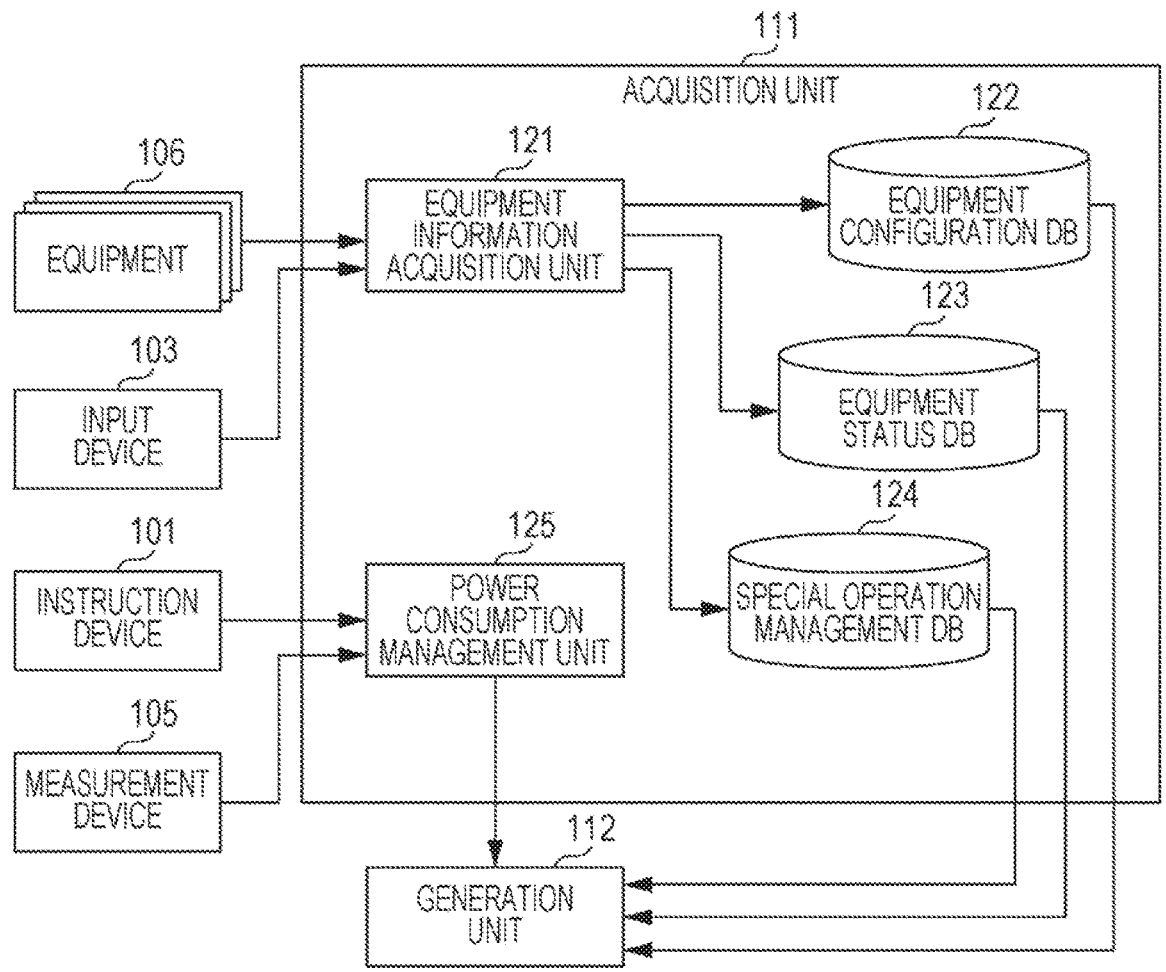
FIG. 3 is a diagram illustrating an exemplary configuration of an acquisition unit according to an embodiment.
FIG. 4 is a diagram illustrating an example of an equipment information database (DB) according to an embodiment.

FIG. 3 illustrates an exemplary configuration of the acquisition unit 111 illustrated in FIG. 2. The acquisition unit 111 is provided with an equipment information acquisition unit 121, an equipment configuration database (DB) 122, an equipment status DB 123, a special operation management DB 124, and a power consumption management unit 125, for example.

The equipment information acquisition unit 121 is a processing unit that acquires information about the multiple pieces of equipment 106. The equipment information acquisition unit 121 may acquire information about the multiple pieces of equipment 106 from the multiple pieces of equipment 106, acquire information about the multiple pieces of equipment 106 from the input device 103, or acquire information about the multiple pieces of equipment 106 from the multiple pieces of equipment 106 and the input device 103. The equipment information acquisition unit 121 stores information about the multiple pieces of equipment 106 in the equipment configuration DB 122, the equipment status DB 123, and the special operation management DB 124.

The power consumption management unit 125 is a processing unit that manages the power consumption amount of the multiple pieces of equipment 106. For example, the power consumption management unit 125 acquires the reduction target period and the reduction target amount by receiving an instruction signal indicating the reduction target period and the reduction target amount for the power consumption amount from the instruction device 101. The power consumption management unit 125 may also acquire the reduction target period and the reduction target amount by deriving the reduction target period and the reduction target amount on the basis of the power consumption amount measured by the measurement device 105, so that the power consumption amount during a certain period becomes less than or equal to a certain threshold value.

Additionally, the power consumption management unit 125 may also measure, via the measurement device 105, the amount of reduction in the power consumption amount during the reduction target period for the amount of power consumed.

The generation unit 112 acquires information about the multiple pieces of equipment 106 from the equipment configuration DB 122, the equipment status DB 123, and the special operation management DB 124. Also, the generation unit 112 acquires the reduction target period and the reduction target amount from the power consumption management unit 125. The equipment information acquisition unit 121 may also acquire information about the multiple pieces of equipment 106 from the equipment configuration DB 122, the equipment status DB 123, and the special operation management DB 124, and the generation unit 112 may acquire the information about the multiple pieces of equipment 106 from the equipment information acquisition unit 121.

Note that the equipment configuration DB 122, the equipment status DB 123, and the special operation management DB 124 may also not be disposed in the acquisition unit 111. In other words, the acquisition unit 111 may also not be provided with the equipment configuration DB 122, the equipment status DB 123, and the special operation management DB 124. Additionally, for example, the acquisition unit 111 may store information about the multiple pieces of equipment 106 in an external equipment configuration DB 122, equipment status DB 123, and special operation management DB 124.

In addition, the acquisition unit 111 may also be provided with a history DB for storing a history of the power consumption amount and the status of the multiple pieces of equipment 106, Alternatively, the energy management device 104 may be provided with a history DB external to the acquisition unit 111. Additionally, components such as the equipment information acquisition unit 121 and the power consumption management unit 125 of the acquisition unit 111 may store a history of the power consumption amount and the status in the history DB. Additionally, the generation unit 112 may reference the history DB to generate multiple control patterns.

FIG. 4 is a diagram illustrating an example of the equipment configuration DB 122 illustrated in FIG. 3. The equipment configuration DB 122 includes information related to the configuration of the multiple pieces of equipment 106. Specifically, in the example of FIG. 4, the equipment configuration DB 122 includes an identification number (ID), an equipment type, and an installation location for each of the multiple pieces of equipment 106 as information.

The identification number is an identifier for identifying each of the multiple pieces of equipment 106. The equipment type is the type of each of the multiple pieces of equipment 106, and indicates an air conditioner, a showcase, a lighting device, or the like. The installation location is the location where each of the multiple pieces of equipment 106 is installed.

FIG. 5 is a diagram illustrating an example of the equipment status DB 123 illustrated in FIG. 3. The equipment status DB 123 includes a status related to each of the multiple pieces of equipment 106 as information. Specifically, in the example of FIG. 5, the equipment status DB 123 corresponds to equipment 106 for which the equipment type is air conditioner (indoor unit), and includes an identification number, an update time, an operating status, a running mode, a set temperature, an indoor temperature, an outdoor temperature, an indoor humidity, and an outdoor humidity as information.

The update time is the time when the record indicating the status related to the equipment 106 was updated, and is a time corresponding to the status indicated by the record. The operating status is whether or not the equipment 106 is operating (whether the equipment 106 is on or off), and corresponds to the on/off status of the equipment 106. The running mode is the running mode of the equipment 106, and indicates cooling, heating, dehumidifying, humidifying, or the like. The set temperature is a temperature set with respect to the equipment 106 as a target temperature for the indoor temperature.

The indoor temperature is the temperature inside the facility where the equipment 106 is installed. The outdoor temperature is the outdoor temperature surrounding the facility where the equipment 106 is installed. The indoor humidity is the humidity inside the facility where the equipment 106 is installed. The outdoor humidity is the outdoor humidity surrounding the facility where the equipment 106 is installed.

The indoor temperature, the outdoor temperature, the indoor humidity, and the outdoor humidity may also be used to generate a recommended control pattern. For example, if the difference between the indoor temperature and the outdoor temperature is less than or equal to a certain threshold value, and the difference between the indoor humidity and the outdoor humidity is less than or equal to a certain threshold value, a control pattern that shuts down the air conditioner may be generated. Also, past controls for an equal or similar environment may be referenced to generate a recommended control pattern.

The items included in the equipment status DB 123 are different for each equipment type. The equipment status DB 123 may also include a different table for each equipment type. For example, the equipment status DB 123 includes information indicating a status obtained in the equipment 106. Additionally, the equipment status DB 123 may also include information indicating a status measured by a measuring instrument included in the equipment 106. Also, the equipment status DB 123 may include information indicating the values of various settings as information indicating a status.

Figures 6, 7:
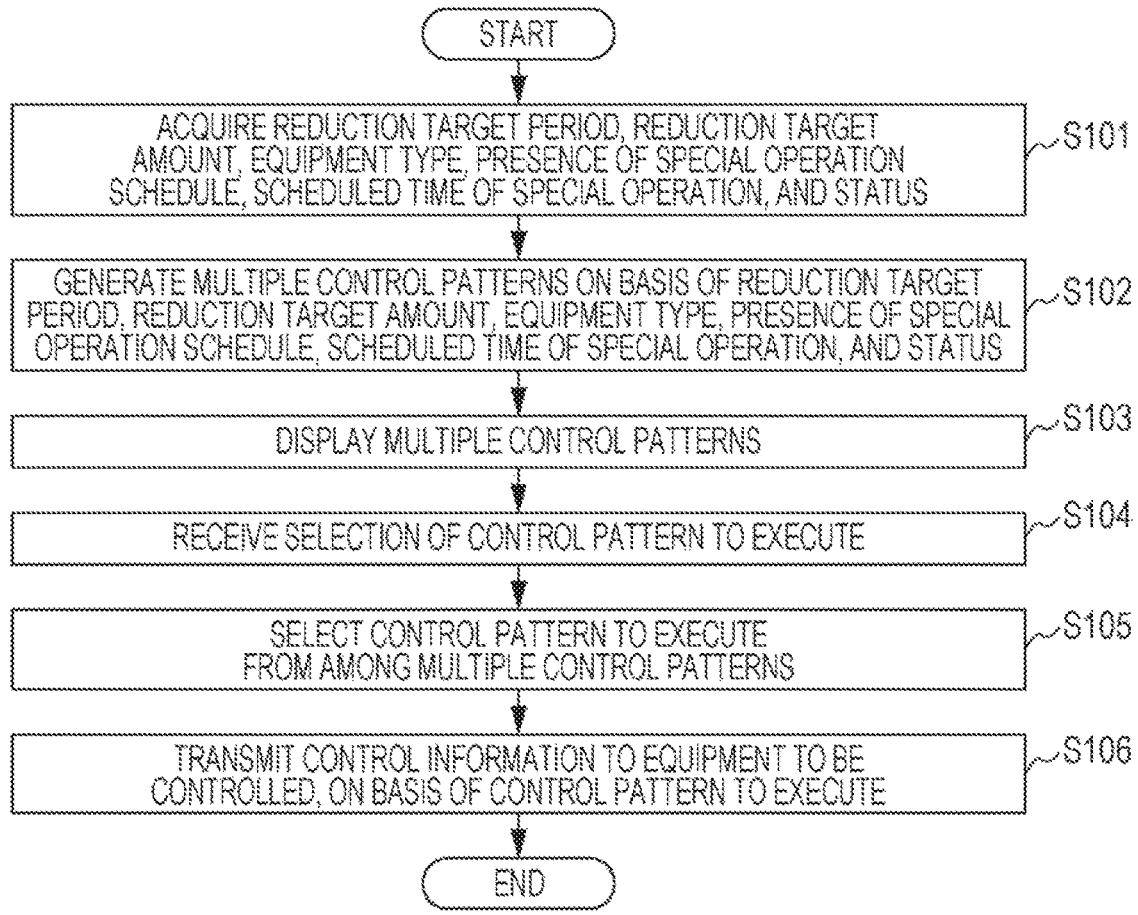
FIG. 6 is a diagram illustrating an example of a special operation management database (DB) according to an embodiment.
FIG. 7 is a flowchart illustrating a basic example of the operation of an energy management device according to an embodiment.

FIG. 6 is a diagram illustrating an example of the special operation management DB 124 illustrated in FIG. 3. The special operation management DB 124 stores information related to a special operation of each of the multiple pieces of equipment 106. Specifically, in the example of FIG. 6, the special operation management DB 124 includes an identification number, a presence of a special operation schedule, and a scheduled time of a special operation as information.

The presence of a special operation schedule is the presence or absence of a schedule for a special operation of each of the multiple pieces of equipment 106. In other words, the presence of a special operation schedule indicates whether or not each of the multiple pieces of equipment 106 has a special operation schedule. The scheduled time of a special operation is the scheduled time of a special operation of each of at least one equipment 106 having a special operation schedule, and indicates a scheduled start time and a scheduled end time of the special operation.

A special operation is an operation having greater power consumption than normal operation. In other words, the power consumption during the time while the special operation is being conducted is greater than the power consumption at other times. For example, the special operation of a showcase may be a defrosting operation. Also, the special operation of an air conditioner may be a self-cleaning operation, and the special operation of an electric kettle may be a heating operation.

For example, the showcase having the identification number 4 is scheduled to conduct a defrosting operation from 2:00 pm to 230 pm on Aug. 10, 2016. However, if the reduction target period for the power consumption amount is from 1:00 pm to 3:00 pm on the same day, a control pattern that postpones the defrosting operation until after 3:00 pm is generated.

[Operation of Energy Management Device]

FIG. 7 is a flowchart illustrating a basic example of the operation of the energy management device 104 illustrated in FIG. 2.

First, the acquisition unit 111 acquires the reduction target period for the power consumption amount, the reduction target amount for the power consumption amount, the equipment type of each piece of equipment 106, the presence of a special operation schedule for each piece of equipment 106, the scheduled time of a special operation for equipment 106 having a special operation schedule, and the status related to each piece of equipment 106 (S101).

Next, the generation unit 112 generates multiple control patterns on the basis of the information acquired by the acquisition unit 111. In other words, the generation unit 112 generates multiple control patterns on the basis of the reduction target period, the reduction target amount, the equipment type, the presence of a special operation schedule, the scheduled time of a special operation, and the status (S102).

At this point, each of the multiple control patterns is a control pattern with respect to the multiple pieces of equipment 106, and the control contents in the multiple control patterns are different from each other. Also, at least one of the multiple control patterns is a control pattern for shifting the scheduled time of a special operation to outside the reduction target period, and is a control pattern for reducing the power consumption amount by the reduction target amount or more during the reduction target period.

Next, the generation unit 112 displays the multiple generated control patterns on the display device 102 (S103), Next, the selection unit 113 accepts the selection of a control pattern to execute from a user via the input device 103

(S104). Next, the selection unit 113 obeys the accepted selection and selects the control pattern to execute from among the multiple control patterns (S105).

Next, the control unit 114 transmits control information for controlling equipment 106 to be controlled to the equipment 106 to be controlled, on the basis of the control pattern to execute selected by the selection unit 113 (S106).

Note that the display of the multiple control patterns (S103) and the acceptance of a selection (S104) may also not be conducted. The selection unit 113 may also select the control pattern to execute from among the multiple control patterns on the basis of a certain priority ranking. For example, the selection unit 113 may select the control pattern by which the power consumption amount is reduced the most, select the control pattern by which the amount of reduction in the power consumption amount is closest to the reduction target amount, or select a control pattern that maintains the operation of high-priority equipment 106.

Additionally, the acceptance of a selection (S104) may not be conducted, while the display of the multiple control patterns (S103) may be conducted. In this case, a control pattern to execute that is selected automatically may be displayed together with the multiple control patterns. With this arrangement, the user is able to check the multiple control patterns and the control pattern to execute.

Additionally, instead of the display of the multiple control patterns (S103), audio expressing the multiple control patterns may also be output through an audio output device (speaker). In this case, the acceptance of a selection (S104) may be conducted without conducting the display of the multiple control patterns (S103).

Additionally, all of the control patterns generated by the generation unit 112 may be each a control pattern for shifting the scheduled time of a special operation to outside the reduction target period. Additionally, all of the control patterns generated by the generation unit 112 may be each a control pattern for reducing the power consumption amount by the reduction target amount or more during the reduction target period.

Figure 8:
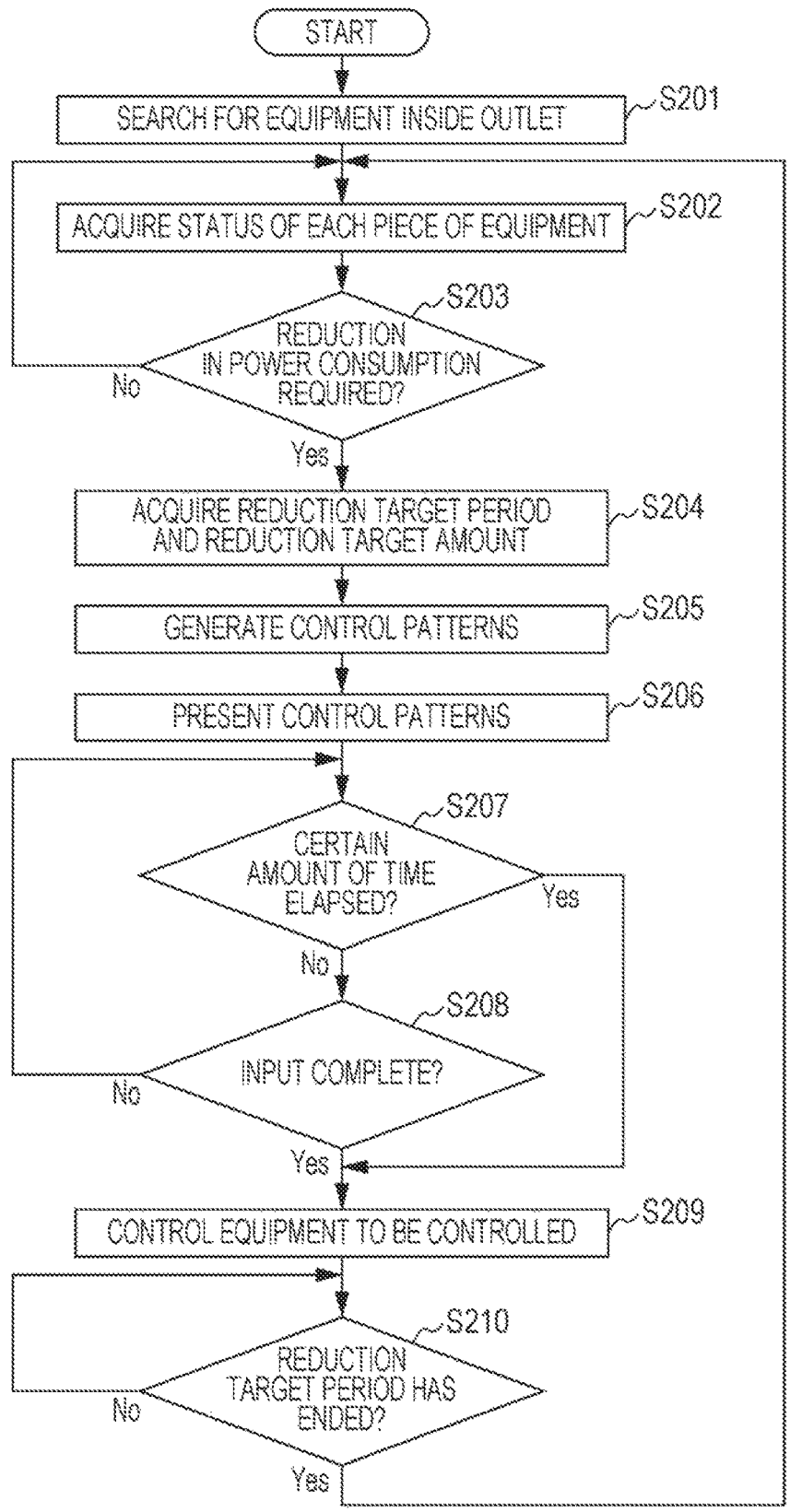
FIG. 8 is a flowchart illustrating a specific example of the operation of an energy management device according to an embodiment.

FIG. 8 is a flowchart illustrating a specific example of the operation of the energy management device 104 illustrated in FIG. 2.

First, the equipment information acquisition unit 121 of the acquisition unit 111 searches for multiple pieces of equipment 106 inside an outlet (S201). The equipment information acquisition unit 121 may also search for equipment 106 in the area surrounding an outlet. Subsequently, the equipment information acquisition unit 121 stores information about the multiple pieces of equipment 106 found by the search in the equipment configuration DB 122 and the like.

The equipment information acquisition unit 121 may also accept information about the multiple pieces of equipment 106 from a user via the input device 103, and store the accepted information in the equipment configuration DB 122 and the like. For example, the equipment information acquisition unit 121 may supplement the information about the multiple pieces of equipment 106 found by search with information obtained from the input device 103. As another example, information about equipment 106 that does not include a communication function may be supplemented with information obtained from the input device 103.

Next, the equipment information acquisition unit 121 periodically acquires the status of each piece of equipment 106 (S202). Subsequently, the equipment information acquisition unit 121 stores the acquired status in the equipment status DB 123. Subsequently, the status acquisition process (S202) is repeated until a reduction in the power consumption amount is required (S203).

Next, the power consumption management unit 125 acquires and transmits to the generation unit 112 the reduction target period and the reduction target amount for the power consumption amount (S204).

Note that the method of acquiring the reduction target period and the reduction target amount is not limited. For example, the acquisition of the reduction target period and the reduction target amount may be conducted by receiving an instruction signal (demand response signal) indicating the reduction target period and the reduction target amount from the instruction device 101. Alternatively, the power consumption amount of the multiple pieces of equipment 106 may be acquired from the measurement device 105, and the reduction target period and the reduction target amount may be derived so that the power consumption amount does not exceed a preset threshold value.

Next, the generation unit 112 generates multiple control patterns to present to the user (S205). Subsequently, the generation unit 112 presents the multiple control patterns to the user by transmitting the multiple generated control patterns to the display device 102 (S206).

Next, the selection unit 113 accepts the selection of a control pattern to execute from the user via the input device 103. At this time, if a certain amount of time elapses before the input of a selection is completed (S207, Yes), the selection unit 113 selects a control pattern to execute from among the multiple control patterns on the basis of a certain priority ranking. If the input of a selection is completed before the certain amount of time elapses (S208, Yes), the selection unit 113 selects the control pattern to execute from among the multiple control patterns on the basis of the input information (that is, the accepted selection).

Next, the control unit 114 follows the control pattern to execute, and controls the equipment 106 to be controlled (S209). Specifically, the control unit 114 controls the equipment 106 to be controlled by transmitting, to the equipment 106 to be controlled at the start of the reduction target period, control information for controlling the equipment 106 to be controlled in accordance with the control pattern to execute.

After that, when the reduction target period ends (S210, Yes), the process is repeated from the process of acquiring the status of each equipment 106 (S202). At this time, the control for reducing the power consumption amount may also be canceled.

Note that if the certain amount of time elapses before the input of a selection is completed (S207, Yes), the selection unit 113 may also select a control pattern that does not control the multiple pieces of equipment 106.

Figure 9:
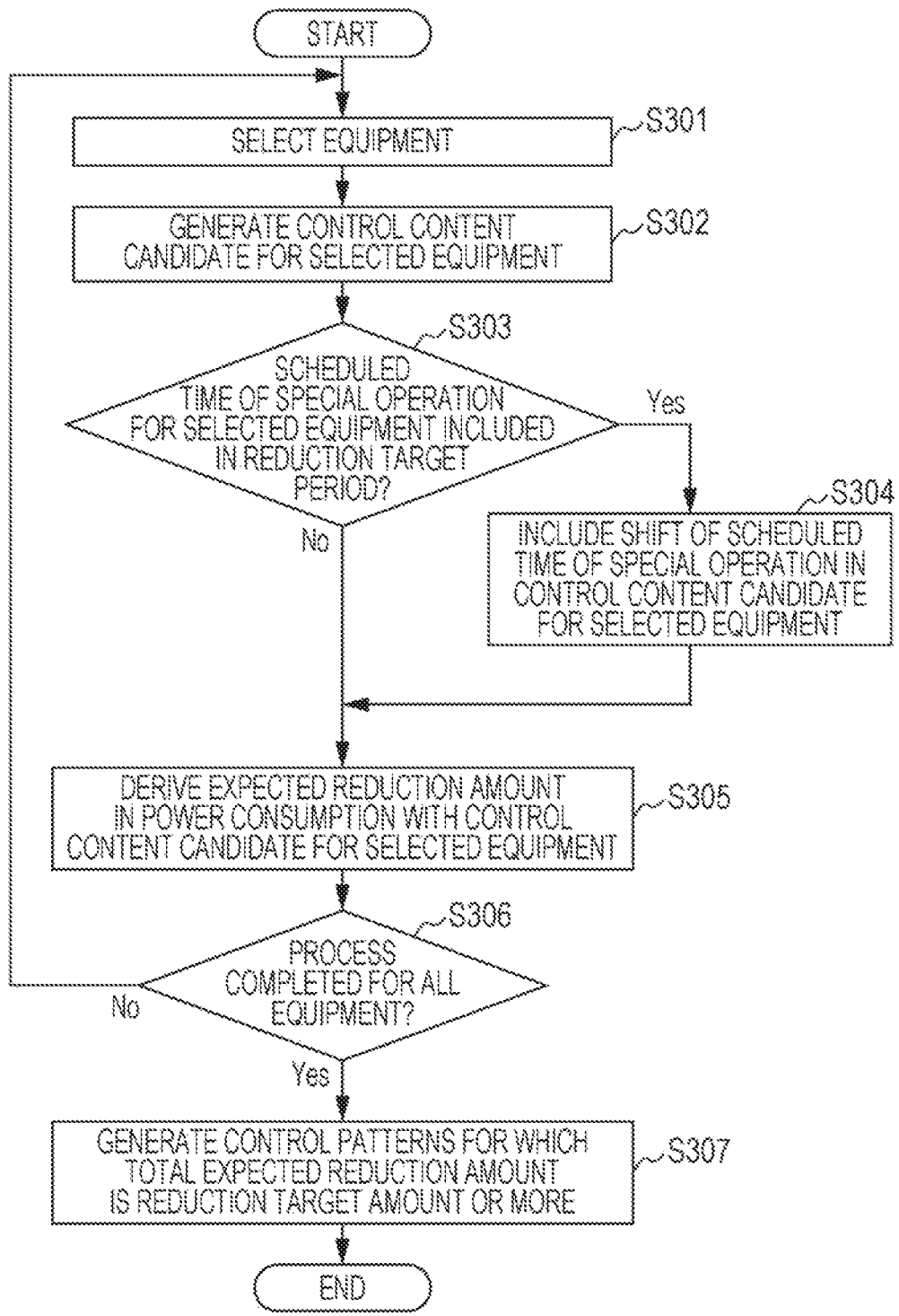
FIG. 9 is a flowchart illustrating an example of a control pattern generation process according to an embodiment.

FIG. 9 is a flowchart illustrating an example of a control pattern generation process by the generation unit 112 illustrated in FIG. 2.

First, the generation unit 112 selects one from among the multiple pieces of equipment 106 (S301). For example, the generation unit 112 references the equipment configuration DB 122, and selects an unselected piece of equipment 106 in order of the identification number.

Next, the generation unit 112 generates a control content candidate for the selected equipment 106 (the piece of equipment 106 selected from among the multiple pieces of equipment 106) (S302). For example, the generation unit 112 references the equipment configuration DB 122 and the equipment status DB 123, and generates a control content candidate for reducing the power consumption amount of the selected equipment 106.

For example, if the equipment type of the selected equipment 106 is a lighting device, in the case in which the operating status of the equipment 106 is ON, the control content candidate may be to set the operating status of the selected equipment 106 to OFF. Also, in the case in which the equipment type of the selected equipment 106 is an air conditioner, and the set temperature of the selected equipment 106 is not within a certain range from the outside temperature, the control content candidate may be to bring the set temperature to within a certain range from the outside temperature. Also, in the case in which the equipment type of the selected equipment 106 is a showcase, the control content candidate may be to turn off interior lighting in the selected equipment 106.

The generation unit 112 may also generate a control that reduced the power consumption amount in the past as the control content candidate. In this case, the generation unit 112 may generate a control for a past environment that resembles the current environment (indoor temperature, outdoor temperature, indoor humidity, and outdoor humidity) as the control content candidate.

The generation unit 112 may also generate multiple control content candidates with respect to one piece of selected equipment 106.

Next, the generation unit 112 references the special operation management DB 124, and determines whether or not the selected equipment 106 has a special operation schedule, and also whether or not the scheduled time of a special operation of the selected equipment 106 is included in the reduction target period (S303).

Subsequently, if the scheduled time of a special operation of the selected equipment 106 is included in the reduction target period (S303, Yes), the generation unit 112 includes shifting the scheduled time of a special operation to outside the reduction target period in the control content candidate for the selected equipment 106 (S304). For example, the generation unit 112 includes shifting the scheduled time of a special operation to after the end of the reduction target period in the control content candidate for the selected equipment 106.

Next, the generation unit 112 derives an expected reduction amount in the power consumption amount for the control content candidate for the selected equipment 106 (S305). For example, the generation unit 112 may derive an expected reduction amount in the power consumption amount by estimating the power consumption amounts before and after control based on the control content candidate, on the basis of a predetermined estimated power consumption amount for each status of the equipment 106. Alternatively, the generation unit 112 may derive an expected reduction amount in the power consumption amount on the basis of the amount of reduction in the power consumption amount from a past control that resembles the control content candidate.

Next, the generation unit 112 determines whether the generation of a control content candidate and the derivation of an expected reduction amount have been completed for all equipment 106 (S306), If the generation and derivation have not been completed (S306, No), the generation unit 112 repeats the process from the equipment selection (S301).

Next, the generation unit 112 combines multiple control content candidates with respect to multiple pieces of equipment 106 so that the total expected reduction amount is equal to or greater than the reduction target amount, and generates the combination as a control pattern (S307). For example, the generation unit 112 generates multiple combinations for which the total expected reduction amount is equal to or greater than the reduction target amount as multiple control patterns.

The generation unit 112 may also generate multiple control patterns in which the total expected reduction amounts are different from each other. For example, the generation unit 112 may generate multiple control patterns such as "large power savings", "medium power savings", and "small power savings". Alternatively, the generation unit 112 may generate multiple control patterns in which the total expected reduction amounts are equal to each other. For example, the generation unit 112 may generate a control pattern that turns off a lighting device and a control pattern that brings the set temperature of an air conditioner closer to the outdoor temperature as multiple control patterns in which the total expected reduction amounts are equal to each other.

Note that in the above operation, the generation unit 112 does not generate multiple control patterns in which the expected reduction amount is less than the reduction target amount. However, control patterns in which the total expected reduction amount is less than the reduction target amount may also be included among the multiple control patterns generated by the generation unit 112.

Also, in the above operation, the generation unit 112 generates control patterns that shift the scheduled time of a special operation to outside the reduction target period. However, the generation unit 112 may also generate control patterns that keep the scheduled time of a special operation within the reduction target period without shifting the scheduled time of a special operation to outside the reduction target period. In other words, control patterns that keep the scheduled time of a special operation within the reduction target period without shifting the scheduled time of a special operation to outside the reduction target period may also be included among the multiple control patterns generated by the generation unit 112.

Additionally, the generation unit 112 may also generate control patterns that shift the scheduled time of a special operation to outside the reduction target period for a subset of the multiple pieces of equipment 106 having a special operation schedule, but keep the scheduled time of a special operation within the reduction target period for another subset.

Additionally, the generation unit 112 may also generate control content candidates that only shift the scheduled time of a special operation to outside the reduction target period. In other words, the generation unit 112 may generate control content candidates that shift the scheduled time of a special operation to outside the reduction target period, but maintain the status otherwise. Additionally, the generation unit 112 may also generate control content candidates with respect to only a subset of the multiple pieces of equipment 106.

Additionally, the generation unit 112 may generate a control pattern that does not control the multiple pieces of equipment 106 as one of the multiple control patterns.

As another example, the generation unit 112 may assign weighting values to control content candidates on the basis of a trend in the control patterns to execute which have been selected by the user in the past. Specifically, on the basis of a past trend, the generation unit 112 may assign a large weighting value to a certain control content candidate as the probability (frequency) of a control pattern including that control content candidate being selected as the control pattern to execute increases.

Additionally, the generation unit 112 may also compute an evaluation score by multiplying the expected reduction amount of a control content candidate by the weighting value of the control content candidate. Subsequently, the generation unit 112 may generate multiple control patterns including the combinations having the highest evaluation scores as control patterns from among multiple combinations of multiple control content candidates. Additionally, the generation unit 112 may generate multiple control patterns including the combinations having the greatest total expected reduction amounts as control patterns from among multiple combinations of multiple control content candidates.

[Examples of Control Patterns]

FIGS. 10 to 12 illustrate examples of multiple control patterns generated on the basis of information about multiple pieces of equipment 106 illustrated in FIGS. 4 to 6, Note that the format of the control information in these examples conforms to ECHONET Lite (registered trademark), a standard communication protocol for a home energy management system (HEMS).

FIG. 10 schematically illustrates a data table constituting a control pattern #1 from among multiple control patterns. The control pattern #1 includes control information #1-1 that sets the set temperature of an air conditioner (indoor unit) inside the shop on the east side to 28 degrees, control information #1-2 that sets the set temperature of an air conditioner (indoor unit) inside the shop on the west side to 28 degrees, and control information #1-3 that turns off a lighting device inside the shop on the south side.

Note that if the reduction target period is from 1:00 pm to 3:00 pm on Aug. 10, 2016, the control pattern #1 may also include control information that shifts the scheduled time of a special operation of a showcase inside the shop on the southeast side to between 3:00 pm and 3:30 pm.

FIG. 11 schematically illustrates a data table constituting a control pattern #2 from among multiple control patterns. The control pattern #2 includes control information #2-1 that turns off an air conditioner (indoor unit) inside the shop on the east side, control information #2-2 that turns off an air conditioner (indoor unit) inside the shop on the west side, and control information #2-3 that turns off a lighting device inside the shop on the south side.

Note that if the reduction target period is from 1:00 pm to 3:00 pm on Aug. 10, 2016, the control pattern #2 may also include control information that shifts the scheduled time of a special operation of a showcase inside the shop on the southeast side to between 3:00 pm and 3:30 pm.

FIG. 12 schematically illustrates a control pattern #3 from among multiple control patterns. The control pattern #3 is a control pattern that does not control the multiple pieces of equipment 106, and does not include any control information.

Figure 13:
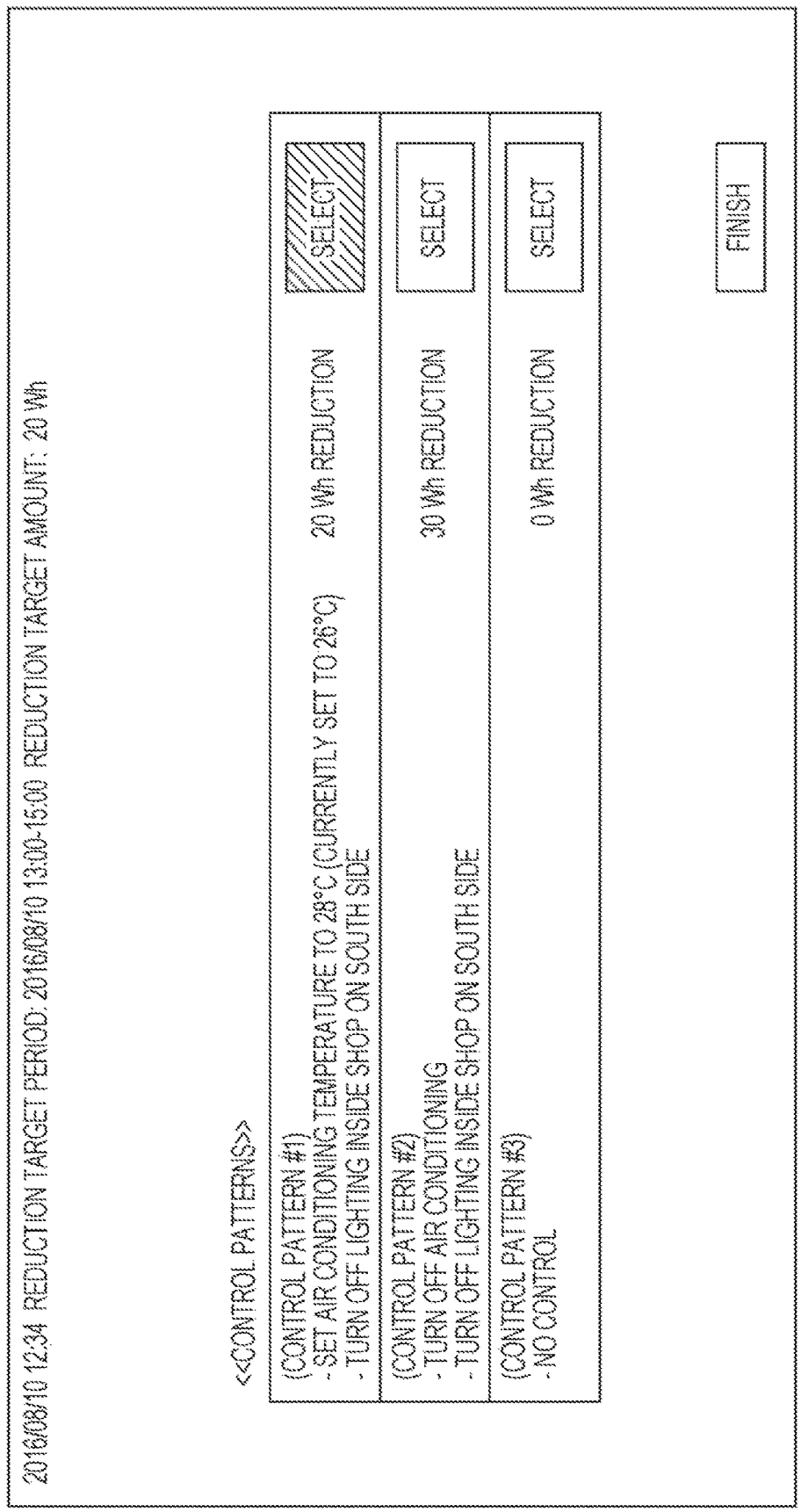
FIG. 13 is a diagram illustrating an example of a representation of a screen for selecting a control pattern to execute according to an embodiment.

FIG. 13 illustrates an example of a representation of a screen for selecting a control pattern to execute from among the multiple control patterns illustrated in FIGS. 10 to 12. In this example, on a device in which the display device 102 and the input device 103 are integrated, multiple control patterns are displayed, and the selection of the control pattern to execute is input.

Specifically, in this example, the reduction target period, the reduction target amount, and multiple control patterns are displayed in the upper portion of the screen. Also, for each control pattern, the control content is displayed. Also, for each control pattern, the expected reduction amount is displayed. Additionally, a Select button for selecting one control pattern to execute from among the multiple control patterns is displayed as a GUI element. Also, a Finish button for confirming the selection of the control pattern to execute is displayed as a GUI element.

In addition, if a control pattern includes shifting the operating time of a special operation to outside the reduction target period, the shifting of the operating time of the special operation to outside the reduction target period may also be displayed as the control content of the control pattern. For example, shifting a defrosting operation of a showcase inside the shop on the southeast side to between 3:00 pm and 3:30 pm may be displayed as the control content of a control pattern.

Through an operating screen like in FIG. 13, the energy management device 104 is able to present multiple control patterns to the user, and accept the selection of the control pattern to execute from the user. By causing the user to select the control pattern to execute from among multiple control patterns, the energy management device 104 is able to encourage the user to carry out energy conservation voluntarily. With this arrangement, the energy management device 104 is able to keep a control for energy conservation from being nullified by user operations.

Specifically, in a case in which an automatic control of raising the set temperature of an air conditioner in the summer is conducted, there is a possibility that the user may feel uncomfortable, and perform a manual control of lowering the set temperature of the air conditioner. As a result, there is a possibility that the reduction target amount for the power consumption amount may not be achieved. The energy management device 104 is able to moderate such undesirable effects by causing the user to select a control pattern to execute from among multiple control patterns.

Conclusion and Supplemental Remarks

As above, the energy management device 104 is able to appropriately support energy conservation based on a reduction target period and a reduction target amount for the power consumption amount of multiple pieces of equipment 106.

Specifically, the energy management device 104 is provided with an acquisition unit 111, a generation unit 112, a selection unit 113, and a control unit 114. The acquisition unit 111 acquires a reduction target period, a reduction target amount, an equipment type, a presence of a special operation schedule, a scheduled time of a special operation, and a status.

Herein, the reduction target period is a period during which the power consumption amount of the multiple pieces of equipment 106 is to be reduced. The reduction target amount is a target amount by which the power consumption amount is to be reduced during the reduction target period. The equipment type is the type of equipment for each of the multiple pieces of equipment 106. The presence of a special operation schedule is the presence or absence of a schedule for a special operation of each of the multiple pieces of equipment 106. The scheduled time of a special operation is a scheduled time for a special operation of each of at least one equipment 106 having a special operation schedule from among the multiple pieces of equipment 106. The status is a status related to each of the multiple pieces of equipment 106.

The generation unit 112 generates multiple control patterns on the basis of the reduction target period, the reduction target amount, the equipment type, the presence of a special operation schedule, the scheduled time of a special operation, and the status. Each of the multiple control patterns is a control pattern with respect to the multiple pieces of equipment 106, and the control content is different among the multiple control patterns. Also, at least one of the multiple control patterns is a control pattern for shifting the scheduled time of a special operation to outside the reduction target period, and is a control pattern for reducing the power consumption amount by the reduction target amount or more during the reduction target period.

The selection unit 113 selects a control pattern to execute from among the multiple control patterns. The control unit 114 transmits control information for controlling the equipment 106 to be controlled to the equipment 106 to be controlled from among the multiple pieces of equipment 106, on the basis of the selected control pattern to execute.

With this arrangement, the equipment 106 to be controlled is controlled appropriately in accordance with the control pattern to execute with respect to multiple pieces of equipment 106. Also, flexible control of multiple pieces of equipment 106 on the basis of multiple control patterns is possible. In addition, in a case in which the scheduled time for a special operation is shifted, and a control pattern for reducing the power consumption amount of the reduction target amount or more is selected as the control pattern to execute, the reduction of the power consumption amount is conducted appropriately.

Consequently, the energy management device 104 is able to appropriately support energy conservation based on a reduction target period and a reduction target amount for the power consumption amount of multiple pieces of equipment 106.

For example, the generation unit 112 may also display multiple control patterns on the display device 102. With this arrangement, the energy management device 104 is able to present multiple control patterns related to energy conservation to a user. Consequently, the energy management device 104 is able to encourage the user to take action regarding energy conservation.

As another example, the selection unit 113 may also accept the selection of the control pattern to execute from a user via the input device 103. With this arrangement, the energy management device 104 is able to select a control pattern to execute in accordance with an operation performed by a user. Consequently, the energy management device 104 is able to select an appropriate control pattern as the control pattern to execute.

As another example, the equipment type with respect to one of the multiple pieces of equipment 106 may be any of an air conditioner, a showcase, and a lighting device. With this arrangement, the energy management device 104 is able to generate a control pattern on the basis of an air conditioner, a showcase, or a lighting device.

As another example, the status with respect to one of the multiple pieces of equipment 106 may include at least one of an operating status, a running mode, a set temperature, an indoor temperature, an outdoor temperature, an indoor humidity, and an outdoor humidity. With this arrangement, the energy management device 104 is able to generate a control pattern on the basis of an operating status, a running mode, a set temperature, an indoor temperature, an outdoor temperature, an indoor humidity, or an outdoor humidity.

As another example, a special operation with respect to one among at least one equipment 106 having a special operation schedule may be a defrosting operation. With this arrangement, the energy management device 104 is able to generate a control pattern for shifting a defrosting operation to outside a reduction target period.

As another example, each of the multiple control patterns may be a control pattern for shifting the scheduled time of a special operation to outside the reduction target period. With this arrangement, no matter which control pattern is selected as the control pattern to execute, the special operation is shifted appropriately, and an increase in the power consumption amount during the reduction target period is moderated.

As another example, each of the multiple control patterns may be a control pattern for reducing the power consumption amount by the reduction target amount or more during the reduction target period. With this arrangement, no matter which control pattern is selected as the control pattern to execute, the power consumption amount is reduced appropriately.

As another example, the multiple control patterns may also include a control pattern in which the multiple pieces of equipment 106 are not controlled. With this arrangement, the energy management device 104 is able to reject control for reducing the power consumption amount in accordance with the situation.

As another example, in a case in which a special operation is conducted periodically, or even in a case in which a special operation is conducted irregularly, such as during startup or during shutdown, a control pattern for prohibiting the special operation during the reduction target period, and shifting the scheduled time of the special operation to outside the reduction target period, may also be generated.

As another example, a control pattern for shifting the scheduled time of a special operation to after the end of the reduction target period may be generated, and a control pattern for shifting the scheduled time of a special operation to before the start of the reduction target period may be generated.

As another example, the control unit 114 may also control a special operation on the basis of information included in the special operation management DB 124. For example, the control unit 114 may cause a piece of equipment 106 to start a special operation by transmitting control information causing the equipment 106 to start the special operation, on the basis of the scheduled time of the special operation in the special operation management DB 124. In this case, the control unit 114 may also shift the scheduled time of a special operation by updating the scheduled time of a special operation in the special operation management DB 124.

As another example, a control pattern may include not only control which is conducted by having the energy management device 104 transmit control information to the equipment 106 to be controlled, but also control which is conducted by having the user operate the equipment 106 to be controlled. Additionally, the generation unit 112 is able to encourage the user to operate the equipment 106 to be controlled by displaying such a control pattern on the display device 102.

As another example, a control pattern may also include control that produces power. Specifically, a control pattern may include control that causes a storage battery to discharge, or control that causes a fuel cell to produce electricity.

Also, in the present embodiment, the power consumption amount of a shop is reduced, but the power consumption amount of a facility such as a general residence may also be reduced. In other words, the energy management device 104 is not limited to shops, and may also be used in other facilities.

Additionally, in the foregoing embodiments; each structural element may be configured by dedicated hardware, or realized by executing a software program suited to each structural element. Each structural element may be realized as a result of a program execution unit such as a central processing unit (CPU) or processor reading out and executing a software program recorded on a recording medium such as a hard disk or semiconductor memory. Herein, software that realizes the energy management device 104 and the like of the foregoing embodiment is a program like the following.

Namely, the program causes a computer to execute an energy management method including: acquiring a reduction target period for a power consumption amount of a plurality of equipment, a reduction target amount for the power consumption amount during the reduction target period, an equipment type of each of the plurality of equipment, a presence of a special operation schedule for each of the plurality of equipment, a scheduled time of a special operation for each of at least one equipment having the special operation schedule from among the plurality of equipment, and a status related to each of the plurality of equipment; generating a plurality of control patterns with respect to the plurality of equipment and with mutually different control content, on the basis of the reduction target period, the reduction target amount, the equipment type, the presence of a special operation schedule, the scheduled time of a special operation, and the status; selecting a control pattern to execute from among the plurality of control patterns; and transmitting control information for controlling the equipment to be controlled to the equipment to be controlled among the plurality of equipment, on the basis of the selected control pattern to execute, wherein at least one of the plurality of control patterns is a control pattern for shifting the scheduled time of a special operation to outside the reduction target period, and is a control pattern for reducing the power consumption amount by the reduction target amount or more during the reduction target period.

Also, each structural element included in the energy management device 104 may be a circuit. These circuits may constitute a single circuit as a whole, or be respectively different circuits. Also, each of these circuits may be a general-purpose circuit or a special-purpose circuit.

The foregoing thus describes an energy management device 104 and the like according to one or multiple aspects on the basis of the embodiments, but the present disclosure is not limited to the embodiments, Embodiments obtained by applying various modifications that may occur to persons skilled in the art to the embodiments, as well as embodiments constructed by combining structural elements from different embodiments, may also be included in the scope of the one or multiple aspects insofar as such embodiments do not depart from the gist of the present disclosure.

For example, in the foregoing embodiments, a process executed by a specific structural element may also be executed by a different structural element instead of the specific structural element. Also, the order of the multiple processes may be modified, and multiple processes may also be executed in parallel.

The present disclosure is usable in an energy management device and the like for supporting energy conservation based on a reduction target period and a reduction target amount for a power consumption amount, and is applicable to an energy management system and the like for supporting energy conservation at a facility such as a shop or a residence, for example.

What is claimed is:

1. An energy management device, comprising:
a memory storing instructions; and
a processor that, when executing the instructions stored in the memory, perform operations including:
acquiring a reduction target period, in which power consumption of a plurality of equipment is reduced, a reduction target amount of the power consumption during the reduction target period, an equipment type of each of the plurality of equipment, a presence of a special operation schedule for each of the plurality of equipment, a scheduled time of a special operation for each of at least one equipment having the special operation schedule, and a status of each of the plurality of equipment;
generating a plurality of control patterns with respect to the plurality of equipment, on the basis of the reduction target period, the reduction target amount, the equipment type, the presence of a special operation schedule, the scheduled time of a special operation, and the status, the plurality of control patterns having control content different from each other;
selecting a control pattern to execute from the plurality of control patterns; and
transmitting control information to one of the plurality of equipment, on the basis of the selected control pattern, the control information controlling the one of the plurality of equipment,
wherein, in the generating, the processor performs operations including:
sequentially selecting each equipment of the plurality of equipment,
generating a control content candidate for reducing a power consumption amount of the selected equipment,
determining whether or not the selected equipment has the special operation schedule, and when the selected equipment is determined to have the special operation schedule, determining whether or not the scheduled time of the special operation of the selected equipment is included in the reduction target period,
when it is determined that the scheduled time of the special operation of the selected equipment is included in the reduction target period, including shifting of the scheduled time of the special operation to outside the reduction target period in the control content candidate for the selected equipment,
calculating an expected reduction amount in the power consumption amount for the control content candidate for the selected equipment,
when the expected reduction amount for the control content candidate is calculated for all of the plurality of equipment, combining multiple control content candidates for the plurality of equipment so that a total expected reduction amount for the multiple control content candidates is equal to or greater than the reduction target amount, and generating the combination as one of the plurality of control patterns,
wherein at least one of the plurality of control patterns shifts the scheduled time of a special operation to outside the reduction target period, and reduces the power consumption by the reduction target amount or more during the reduction target period.

2. The energy management device according to claim 1, wherein the processor, when executing the instructions, further performs operations comprising:
displaying the plurality of control patterns on a display.

3. The energy management device according to claim 1, wherein the processor, when executing the instructions, further performs operations comprising:
accepting a selection of the control pattern from a user via an input device.

4. The energy management device according to claim 1, wherein
the equipment type of one of the plurality of equipment is one of an air conditioner, a showcase, and a lighting device.

5. The energy management device according to claim 1, wherein
the status of one of the plurality of equipment includes at least one of an operating status, a running mode, a set temperature, an indoor temperature, an outdoor temperature, an indoor humidity, and an outdoor humidity.

6. The energy management device according to claim 1, wherein
the special operation for one of the at least one equipment having the special operation schedule is a defrosting operation.

7. The energy management device according to claim 1, further comprising a storage that stores a special operation management table, wherein
the special operation management table stores a plurality of equipment identifiers of the plurality of equipment, a presence or absence of the special operation schedule for each of the plurality of equipment identifiers, and the scheduled time of the special operation for each of the at least one equipment having the special operation schedule,
the processor sequentially selects one equipment of the plurality of equipment with reference to the special operation management table, and
the processor determines whether or not the selected equipment has the special operation schedule, and whether or not the scheduled time of the special operation of the selected equipment is included in the reduction target period, with reference to the special operation management table.

8. An energy management method, comprising:
acquiring a reduction target period, in which power consumption of a plurality of equipment is reduced, a reduction target amount of the power consumption during the reduction target period, an equipment type of each of the plurality of equipment, a presence of a special operation schedule for each of the plurality of equipment, a scheduled time of a special operation for each of at least one equipment having the special operation schedule, and a status of each of the plurality of equipment;

generating a plurality of control patterns with respect to the plurality of equipment, on the basis of the reduction target period, the reduction target amount, the equipment type, the presence of a special operation schedule, the scheduled time of a special operation, and the status, the plurality of control patterns having control content different from each other;
selecting a control pattern to execute from the plurality of control patterns; and
transmitting control information to one of the plurality of equipment, on the basis of the selected control pattern, the control information controlling the one of the plurality of equipment,
wherein, the generating includes:
sequentially selecting each equipment of the plurality of equipment,
generating a control content candidate for reducing a power consumption amount of the selected equipment,
determining whether or not the selected equipment has the special operation schedule, and when the selected equipment is determined to have the special operation schedule, determining whether or not the scheduled time of the special operation of the selected equipment is included in the reduction target period,
when it is determined that the scheduled time of the special operation of the selected equipment is included in the reduction target period, including shifting of the scheduled time of the special operation to outside the reduction target period in the control content candidate for the selected equipment,
calculating an expected reduction amount in the power consumption amount for the control content candidate for the selected equipment,
when the expected reduction amount for the control content candidate is calculated for all of the plurality of equipment, combining multiple control content candidates for the plurality of equipment so that a total expected reduction amount for the multiple control content candidates is equal to or greater than the reduction target amount, and generating the combination as one of the plurality of control patterns,
at least one of the plurality of control patterns shifts the scheduled time of a special operation to outside the reduction target period, and reduces the power consumption by the reduction target amount or more during the reduction target period.

* * * * *